United States Patent
Coelho Trindade et al.

(10) Patent No.: US 12,024,827 B2
(45) Date of Patent: Jul. 2, 2024

(54) CONSTRUCTION METHOD FOR PLAYGROUND SURFACING

(71) Applicant: AMORIM CORK COMPOSITES, S.A., Mozelos Vfr (PT)

(72) Inventors: Joana Maria Coelho Trindade, Matoshinhos (PT); Eduardo Neves Martins Soares, Canidelo VNG (PT); Alvaro Daniel Martins Almeida Batista, Tábua (PT); Joao Paulo Do Carmo De Oliveira Carvalho, Gulphilhares (PT); Joao Pedro Correia Camacho, Oporto (PT)

(73) Assignee: AMORIM CORK COMPOSITES, S.A., Mozelos Vfr (PT)

( * ) Notice: Subject to any disclaimer, the term of this patent is extended or adjusted under 35 U.S.C. 154(b) by 934 days.

(21) Appl. No.: 17/015,376

(22) Filed: Sep. 9, 2020

(65) Prior Publication Data

US 2021/0254289 A1 Aug. 19, 2021

(51) Int. Cl.
| | |
|---|---|
| *E01C 13/06* | (2006.01) |
| *C04B 18/24* | (2006.01) |
| *C04B 26/16* | (2006.01) |
| *E01C 19/00* | (2006.01) |
| *C04B 111/00* | (2006.01) |

(52) U.S. Cl.
CPC ............ *E01C 13/06* (2013.01); *C04B 18/245* (2013.01); *C04B 26/16* (2013.01); *E01C 19/002* (2013.01); *C04B 2111/00732* (2013.01); *C04B 2201/20* (2013.01)

(58) Field of Classification Search
CPC ..... E01C 13/06; E01C 19/002; C04B 18/245; C04B 26/16; C04B 2111/00732; C04B 2201/20
See application file for complete search history.

(56) References Cited

U.S. PATENT DOCUMENTS

| | | | | |
|---|---|---|---|---|
| 2,024,158 | A | * 12/1935 | Gallagher | ............. E01C 13/065 404/31 |
| 5,151,230 | A | * 9/1992 | Damberg | ................. C08L 75/14 264/912 |
| 2001/0034399 | A1 * | 10/2001 | Kohlhammer | ........... D04H 1/60 524/501 |
| 2017/0328017 | A1 * | 11/2017 | Craven | .................... E01C 13/02 |
| 2021/0163747 | A1 * | 6/2021 | So | .............................. E04B 5/43 |

FOREIGN PATENT DOCUMENTS

| | | |
|---|---|---|
| KR | 20180052386 A | 5/2018 |
| KR | 101875478 B1 * | 8/2018 |
| KR | 20190085417 A | 7/2019 |

* cited by examiner

*Primary Examiner* — Abigail A Risic
(74) *Attorney, Agent, or Firm* — Calderone Mckay LLC

(57) ABSTRACT

A construction method for playground surfacing. The method of the present invention including the steps of: a) preparing in situ a mixture comprising 29-70% by weight of cork granules and 30-71% by weight of a polymeric binder, at room temperature; b) pouring the mixture obtained in step a) on at least one surface area; c) compacting the mixture to a thickness in the range of 35-135 mm and to a density in the range of 100-300 kg/m$^3$; and d) curing the compacted mixture from step c).

13 Claims, No Drawings

CONSTRUCTION METHOD FOR PLAYGROUND SURFACING

FIELD OF THE INVENTION

The present invention relates to a construction method for playground surfacing.

BACKGROUND OF THE INVENTION

The installation of playground surfacing with materials of sustainable origin and with specific characteristics of impact absorption is currently a widespread concern with regard to recreational areas in schools, playgrounds, municipal fields, etc.

Although loose natural materials, such as sand, gravel or wood chips are widely used, as they are more accessible materials, the costs and maintenance requirements of these materials are quite high. In addition, according to BS EN 1177 Standard (2018)—*Impact Attenuating Playground Surfacing. Determination of the Critical Fall Height*, the loose particles move which causes the actual thickness of the damping layer to vary significantly, depending on the level of use and maintenance of a given area. Consequently, damping is impaired in impact zones where the thickness is not sufficient.

Thus, the disadvantage in impact performance associated with loose natural materials is linked, among other factors, to the difficulty in maintaining uniform thickness associated with adequate damping.

Playground surfacings can also be constructed using granulated synthetic materials, with rubber granules being the most widely used nowadays. This material can originate from Styrene Butadiene Rubber (SBR) and/or Ethylene-Propylene-Diene Rubber Monomer (EPDM). Of these rubbers, SBR is based on black, but it is possible to coat grains with the desired colour, while EPDM, in turn, is manufactured in a variety of colours.

This granulate can also be obtained through a tyre-recycling process, originating from motorcars and heavy vehicles.

In addition, synthetic materials, despite meeting impact absorption criteria, sometimes do not have an optimal water infiltration rate performance and this effect is minimized by the construction of the very base where they are installed.

In addition, the use of rubber (as an example material) on wear surfaces has been considered by several studies to be harmful to the environment and human health. This is not only due to the release of non-biodegradable particles, but also due to the release of volatile compounds when they are under the effect of high temperature.

Surfacings applied to recreational areas, such as playgrounds, game fields, etc., need to meet certain performance and safety criteria. In order to verify and guarantee the fulfilment of such criteria, these surfacings are subjected to a wide range of tests in accordance with the standards established by the competent entities.

In particular, BS EN 1177 Standard limits the level of impact tolerance against a surface to a Head Injury Criterion (HIC) of 1000. This limit was defined based on an in-depth research, taking into account the aim to reduce death and permanent injuries due to head impacts. However, it should be noted that these limits were never intended to prevent other types of injury, such as broken bones, etc. So, the critical fall height for a specific surface is defined according to the thickness of the surface required to limit the HIC to a maximum value of 1000.

However, the fact that a playground surfacing meets the criteria of BS EN 1177 does not mean the absence of injuries on these surfacings, but a reduction in the risk of injury.

In the case of HIC, an impact test is conducted which includes the effects of head deceleration rate and duration during the most critical time period of the impact event. Consequently, this test measures the likelihood of head injury due to impact and is currently the most widely accepted test for assessing possible head injuries.

The HIC value corresponding to 1000 is valid if two of the fall heights report at least one HIC value below 1000 and two above it. So, the final value is calculated based on the interpolation of a curve, converting the value into a Critical Fall Height (CFH) corresponding in meters to a HIC of 1000.

In this sense, any playground surfacing and its respective assembling process have inherently as a condition to meet the HIC criteria identified above.

Patent application KR20190085417A relates to a method for building an environmentally friendly artificial grass playground using corn cobs instead of conventional artificial grass fillers. The surfacing thus obtained maintains an excellent impact absorption capacity and provides a temperature stability according to the use of artificial grass.

Patent application KR20180052386 provides a method of preparing an elastic cork lining material for children's play facilities, comprising the steps of (a) grinding the cork materials to manufacture cork chips and (b) mixture the cork chips with a binder for wood and coat and dry the cork chips to manufacture the elastic cork-type coating. The method disclosed here provides an environmentally friendly elastic coating that does not contain heavy or carcinogenic metals, in order to solve the problems related to the detection of formaldehyde in surfacings of recreational facilities.

So, there is a need to provide a method for building a playground surfacing from natural and recyclable materials, whose resulting surfacing meets the defined HIC criteria.

SUMMARY OF THE INVENTION

The present invention provides a construction method for a playground surfacing comprising the steps of:
a) Preparing in situ a mixture comprising 29-70% by weight of cork granules and 30-71% by weight of a polymeric binder, at room temperature;
b) Pouring the mixture obtained in step a) on at least one surface area;
c) Compacting said mixture to a thickness in the range of 35-135 mm and to a density in the range of 100-300 kg/m$^3$;
d) Curing the compacted mixture from step c).

Preferably, the mixture of step a) is carried out with cork granules having a granulometry in the range of 1-6 mm and, more preferably, with cork granules having a granulometry in the range of 2-4 mm.

Preferably still, the polymeric binder is selected from the group comprising polyurethane, polyester, polyether, polyacrylate, polystyrene, polyvinyl chloride, polyvinyl acetate, acrylic polyesters, polyethylene, polypoxide, silicones, of synthetic origin, natural or combinations thereof. Preferably, the polymeric binder is polyurethane.

In one embodiment, the method further comprises adding at least one additive in the range of 1-20% by weight. Preferably, the additive is selected from the group comprising pigments, flame retardants, antibacterials, UV degradation protection agents, stabilizing agents, surfactants, antifoaming agents, viscosity changers or combinations thereof.

In another embodiment, in step c) the mixture is compacted to a thickness in the range of 75-120 mm and to a density in the range of 140-180 kg/m$^3$.

In a preferred embodiment, the playground surfacing construction method comprises the steps of:
a) Preparing in situ a mixture comprising 51.3% by weight of cork granules and 48.7% by weight of a polymeric binder, at room temperature;
b) Pouring the mixture obtained in step a) on at least one surface area;
c) Compacting said mixture to a thickness of 120 mm and to a density in a range of 140-160 kg/m$^3$;
d) Curing the compacted mixture from step c).

In another preferred embodiment, the playground surfacing construction method comprises the steps of:
a) Preparing in situ a mixture comprising 50% by weight of cork granules and 50% by weight of a polymeric binder, at room temperature;
b) Pouring the mixture obtained in step a) on at least one surface area;
c) Compacting said mixture to a thickness of 120 mm and to a density in a range of 140-160 kg/m$^3$;
d) Curing the compacted mixture from step c).

In yet another preferred embodiment, the playground surfacing construction method comprises the steps of:
a) Preparing in situ a mixture comprising 44.4% by weight of cork granules and 55.6% by weight of a polymeric binder, at room temperature;
b) Pouring the mixture obtained in step a) on at least one surface area;
c) Compacting said mixture to a thickness of 75 mm and to a density in a range of 170-180 kg/m$^3$;
d) Curing the compacted mixture from step c).

In one aspect of the invention, the method further comprises laying an additional top layer. Preferably, said placement of the top layer comprises compacting a mixture of cork granules and polymeric binder to a thickness in the range of 7.5-20 mm and to a density in the range of 200-250 kg/m$^3$.

DETAILED DESCRIPTION OF THE INVENTION

The present invention relates to a construction method for playground surfacing.

Within the context of the present description, the term "comprising" should be understood as "including, among others". As such, the term should not be interpreted as "consisting only of".

Note that any X value presented in the course of this description should be interpreted as an approximate value of the real X value, since such an approximation to the real value would be reasonably expected by the person skilled in the art, due to experimental and/or measurement conditions likely to introduce deviations from the real value.

Unless otherwise stated, the ranges of values presented in this description are intended to provide a simplified and technically accepted way to indicate each individual value within the respective range. As an example, the expression "1 to 2" or "between 1 and 2" means any value within this range, for example 1.0; 1.1; 1.2; 1.3; 1.4; 1.5; 1.6; 1.7; 1.8; 1.9; 2.0. All values mentioned in this description must be interpreted as approximate values, for example the reference to "10° C." means "about 10° C.".

In the present invention, "playground surfacing" means a surface covering an area of an outdoor space intended for recreation, such as playgrounds, game areas, etc.

"Cork granules" are understood, within the context of the present description, to mean cork fragments whose granulometry is comprised between 1 and 6 mm and with a density between 45 and 160 kg/m$^3$.

Within the context of the present invention, "room temperature" is understood to mean a temperature in the range between 10° C. and 40° C.

By "surface area", within the context of the present invention, is understood to mean any measure of area in which it is intended to build a playground surfacing.

In the present invention, "cure" or "curing" refers to the hardening of the polymeric material through a crosslinking method.

The construction method for playground surfacing of the present invention is described in detail below. The method of the present invention comprises the steps of:
a) Preparing in situ a mixture comprising 29-70% by weight of cork granules and 30-71% by weight of a polymeric binder, at room temperature;
b) Pouring the mixture obtained in step a) on at least one surface area;
c) Compacting said mixture to a thickness in the range of 35-135 mm and to a density in the range of 100-300 kg/m$^3$;
d) Curing the compacted mixture from step c).

Surprisingly, it was found that the construction method for playground surfacing of the present invention comprising the in situ preparation of the mixture of cork granules and polymeric binder and its subsequent application, with compaction to a certain thickness range combined with a certain mass range volume, results in a surfacing that meets the impact absorption criteria of BS EN 1177 Standard.

The in situ installation of playground surfacings for outdoor recreational surfaces is known to those skilled in this technical field, however, it was not known that the parameters defined in the compaction step would enhance the impact absorption capacity when the initial mixture comprises cork granules in the proportion shown.

Always bearing in mind the safety of the user, the assessment of the risk of using the playground surfacing is fundamentally measured by the impact associated with the fall and the traumatic head injuries that can be associated with it. So, it was found that the compaction of the mixture of cork granules and polymeric binder to a thickness in the range of 35-135 mm and density in a range of 100-300 kg/m$^3$ results in a playground surfacing that provides a high performance in terms of impact absorption, accessibility for individuals with reduced mobility, water permeability (tested according to EN 12616 Standard), wear resistance (tested according to EN ISO 5470-1 Standard) and light-fastness (tested according to ISO 105-B04: 1994 and ISO 105-B02: 2014 Standards).

When subjected to compaction, the cork undergoes a reduced lateral expansion and its decompression implies a return to initial position. In this way, energy dissipation is associated with the ability to recover, based on the optimal microscopic properties for impact absorption. The presence of a high proportion of air volume allows the cells to be compacted without losing their properties and to remain resilient upon repetition of the impact, an elastic component characteristic being inherent to them.

Due to the nature of in situ compaction, variations of more or less 5 mm in the desired thickness are expected to occur.

Preferably, in the mixture of step a) of the method of the invention, the cork granules have a granulometry in the range of 1-6 mm and, more preferably, in the range of 2-4 mm.

The polymeric binder used in the present invention can be selected from the group comprising polyurethane, polyester, polyether, polyacrylate, polystyrene, polyvinyl chloride, polyvinyl acetate, acrylic polyesters, polyethylene, polyepoxide, silicones, of synthetic origin, natural or combinations thereof.

Preferably, the polymeric binder is polyurethane. Preferably still, the polymeric binder is in liquid form.

In a preferred embodiment, the polyurethane polymer in liquid form can originate from:
- An NCO-terminated polymer, which may be a prepolymer, a polymeric isocyanate, an oligomeric isocyanate, a monomer or a mixture thereof;
- An aromatic diisocyanate of the toluene diisocyanate or methylene-2,2-diisocyanate group;
- An aliphatic diisocyanate of the hexamethylene diisocyanate group, isophorone diisocyanate and 1,4-cyclohexyldiisiocyanate
- A mixture of methylenediphenyl-isocyanate isomer.

In still a preferred embodiment, at least one additive in the range of 1-20% by weight can be added to the mixture from step a).

Preferably, the additive can be selected from the group comprising pigments, flame retardants, antibacterials, UV degradation protection agents, stabilizing agents, surfactants, antifoaming agents, viscosity changers or combinations thereof.

More preferably, the pigments can be of organic or inorganic origin, or a combination of both. Examples of pigments that can be used are iron oxide, titanium oxide, iron oxide hydroxide, chromium (III) oxide, a copper phthalocyanine pigment, or combinations thereof, in the range of 1-15% by weight in the mixture from step a).

Examples of smoke retardants or suppressants that can be used are aluminium or magnesium hydroxide, ammonium polyphosphates, graphite in its expandable form or not, or combinations thereof, in the range of 5-20% by weight in the mixture from step a).

Examples of antibacterials that can be used are silver, zinc piritone or combinations thereof, in the range of 1-5% by weight in the mixture from step a).

Examples of UV degradation protection agents that can be used are sterically hindered amines stabilizing to light, titanium dioxide or combinations thereof, in the range of 1-10% by weight in the mixture from step a).

In an embodiment of the invention, the construction method for playground surfacing further includes the preparation of a top layer, which is placed on the initially prepared layer, also called the base layer.

Preferably, the construction method for this top layer comprises preparing a mixture of cork granules and polymeric binder, which is poured over the base layer and then subjected to a compacting step, to a thickness in the range of 7.5-20 mm and a density in a range of 200-250 kg/m$^3$, followed by a curing step.

The resulting top layer constitutes a wear and protection layer, which has the function of ensuring the durability of the playground surfacing in view to its use. This layer can also have a decorative function, depending on its purpose and place where the playground surfacing is built.

It was found that the existence of said top layer does not increase the impact absorption capability of the playground surfacing.

EXAMPLES

The examples below refer to the preparation of a playground surfacing according to the present invention, in a surface area of 1 m$^2$.

Example 1

Base Layer

A mixture was prepared in situ comprising 4.4 kg of cork granules (37.9% by weight), of 2-4 mm granulometry and 65-85 kg/m$^3$ density, and 7.2 kg (62.1% by weight) of polymeric binder at room temperature. The mixture was poured over an area of 1 m$^2$. Said mixture was compacted to a thickness of 47 mm and a density of 230-250 kg/m$^3$. Said mixture was allowed to cure for 5 days.

The critical fall height (CFH) measured for the playground surfacing obtained was 1.5 m.

Example 2

Base Layer

A mixture was prepared in situ comprising 0.99 kg of cork granules (8.5% by weight), of 1-2 mm granulometry and 50-60 kg/m$^3$ density, 2.96 kg of cork granules (25.4% by weight), 2-4 mm granulometry and 100-120 kg/m$^3$ density, and 7.69 kg of polymeric binder (66.1% by weight), at room temperature. The mixture was poured over an area of 1 m$^2$. Said mixture was compacted to a thickness of 43 mm and a density of 260-280 kg/m$^3$. Said mixture was allowed to cure for 5 days.

The critical fall height (CFH) measured for the playground surfacing obtained was 1.4 m.

Example 3

Base Layer

A mixture was prepared in situ comprising 1.1 kg of cork granules (9.1% by weight), of 1-2 mm granulometry and 75-85 kg/m$^3$ density, 3.3 kg of cork granules (27.3% by weight), 2-4 mm granulometry and 75-85 kg/m$^3$ density, and 7.69 kg of polymeric binder (63.6% by weight), at room temperature. The mixture was poured over an area of 1 m$^2$. Said mixture was compacted to a thickness of 49 mm and a density of 240-250 kg/m$^3$. Said mixture was allowed to cure for 5 days.

The critical fall height (CFH) measured for the playground surfacing obtained was 1.5 m.

Example 4

Base Layer

A mixture was prepared in situ comprising 2.2 kg of cork granules (18.2% by weight), of 2-3 mm granulometry and 55-65 kg/m$^3$ density, 2.2 kg of cork granules (18.2% by weight), 2-4 mm granulometry and 75-85 kg/m$^3$ density, and 7.69 kg of polymeric binder (63.6% by weight), at room temperature. The mixture was poured over an area of 1 m$^2$. Said mixture was compacted to a thickness of 54 mm and a density of 220-230 kg/m$^3$. Said mixture was allowed to cure for 5 days.

The critical fall height (CFH) measured for the playground surfacing obtained was 1.75 m.

Example 5

Base Layer

A mixture was prepared in situ comprising 4.4 kg of cork granules (44.4% by weight), of 2-4 mm granulometry and 75-85 kg/m$^3$ density, and 5.5 kg of polymeric binder (55.6% by weight), at room temperature. The mixture was poured over an area of 1 m$^2$. Said mixture was compacted to a thickness of 64 mm and a density of 170-190 kg/m$^3$. Said mixture was allowed to cure for 5 days.

The critical fall height (CFH) measured for the playground surfacing obtained was 2.1 m.

Example 6

Base Layer

A mixture was prepared in situ comprising 4.4 kg of cork granules (44.4% by weight), of 2-4 mm granulometry and 75-85 kg/m$^3$ density, and 5.5 kg of polymeric binder (55.6% by weight), at room temperature. The mixture was poured over an area of 1 m$^2$. Said mixture was compacted to a thickness of 63 mm and a density of 220-230 kg/m$^3$. Said mixture was allowed to cure for 5 days.

The critical fall height (CFH) measured for the playground surfacing obtained was 2.0 m.

Example 7

Base Layer

A mixture was prepared in situ comprising 4.4 kg of cork granules (44.4% by weight), of 2-4 mm granulometry and 65-85 kg/m$^3$ density, and 5.5 kg of polymeric binder (55.6% by weight), at room temperature. The mixture was poured over an area of 1 m$^2$. Said mixture was compacted to a thickness of 75 mm and a density of 170-180 kg/m$^3$. Said mixture was allowed to cure for 5 days.

Top Layer

A mixture was prepared in situ comprising 2.9 kg of cork granules (50% by weight), of 2-3 mm granulometry and 130-140 kg/m$^3$ density, and 2.9 kg of polymeric binder (50% by weight), at room temperature. The mixture was poured over the previously prepared base layer, in an area of 1 m$^2$. Said mixture was compacted to a thickness of 12 mm and a density of 200-250 kg/m$^3$. Said mixture was allowed to cure for 5 days.

The critical fall height (CFH) measured for the playground surfacing obtained was 2.5 m.

Example 8

Base Layer

A mixture was prepared in situ comprising 8.4 kg of cork granules (50% by weight), of 2-4 mm granulometry and 65-85 kg/m$^3$ density, and 8.4 kg of polymeric binder (50% by weight), at room temperature. The mixture was poured over an area of 1 m$^2$. Said mixture was compacted to a thickness of 120 mm and a density of 140-160 kg/m$^3$. Said mixture was allowed to cure for 5 days.

Top Layer

A mixture was prepared in situ comprising 2.9 kg of cork granules (50% by weight), of 2-3 mm granulometry and 130-140 kg/m$^3$ density, and 2.9 kg of polymeric binder (50% by weight), at room temperature. The mixture was poured over the previously prepared base layer, in an area of 1 m$^2$. Said mixture was compacted to a thickness of 12 mm and a density of 200-250 kg/m$^3$. Said mixture was allowed to cure for 5 days.

The critical fall height (CFH) measured for the playground surfacing obtained was 2.6 m.

Example 9

Base Layer

A mixture was prepared in situ comprising 8.43 kg of cork granules (51.3% by weight), of 2-4 mm granulometry and 65-85 kg/m$^3$ density, and 8.0 kg of polymeric binder (48.7% by weight), at room temperature. The mixture was poured over an area of 1 m$^2$. Said mixture was compacted to a thickness of 120 mm and a density of 140-160 kg/m$^3$. Said mixture was allowed to cure for 5 days.

Top Layer

A mixture was prepared in situ comprising 2.85 kg of cork granules (62.5% by weight), of 2-3 mm granulometry and 130-140 kg/m$^3$ density, and 1.71 kg of polymer binder (37.5% by weight), at room temperature. The mixture was poured over the previously prepared base layer, in an area of 1 m$^2$. Said mixture was compacted to a thickness of 12 mm and a density of 200-250 kg/m$^3$. Said mixture was allowed to cure for 5 days.

The critical fall height (CFH) measured for the playground surfacing obtained was 3.0 m.

Example 10

Base Layer

A mixture was prepared in situ comprising 2.2 kg of cork granules (50% by weight), of 2-4 mm granulometry and 65-85 kg/m$^3$ density, and 2.2 kg of polymeric binder (50% by weight), at room temperature. The mixture was poured over an area of 1 m$^2$. Said mixture was compacted to a thickness of 35 mm and a density of 170-180 kg/m$^3$. Said mixture was allowed to cure for 5 days.

Top Layer

A mixture was prepared in situ comprising 0.59 kg of cork granules (25.7% by weight), of 2-3 mm granulometry and 130-140 kg/m$^3$ density, and 1.71 kg of polymeric binder (74.3% by weight), at room temperature. The mixture was poured over the previously prepared base layer, in an area of 1 m$^2$. Said mixture was compacted to a thickness of 10 mm and a density of 200-250 kg/m$^3$. Said mixture was allowed to cure for 5 days.

The critical fall height (CFH) measured for the playground surfacing obtained was 1.5 m.

Example 11

Base Layer

A mixture was prepared in situ comprising 2.8 kg of cork granules (50% by weight), of 2-4 mm granulometry and 65-85 kg/m$^3$ density, and 2.8 kg of polymeric binder (50% by weight), at room temperature. The mixture was poured over an area of 1 m$^2$. Said mixture was compacted to a thickness of 35 mm and a density of 150-160 kg/m$^3$. Said mixture was allowed to cure for 5 days.

Top Layer

A mixture was prepared in situ comprising 2.85 kg of cork granules (62.5% by weight), of 2-3 mm granulometry and 130-140 kg/m$^3$ density, and 1.71 kg of polymeric binder (37.5% by weight), at room temperature. The mixture was poured over the previously prepared base layer, in an area of 1 m$^2$. Said mixture was compacted to a thickness of 10 mm and a density of 200-250 kg/m$^3$. Said mixture was allowed to cure for 5 days.

The critical fall height (CFH) measured for the playground surfacing obtained was 1.8 m.

Example 12

Base Layer

A mixture was prepared in situ comprising 3.6 kg of cork granules (50% by weight), of 2-4 mm granulometry and 65-85 kg/m$^3$ density, and 3.6 kg of polymeric binder (50% by weight), at room temperature. The mixture was poured over an area of 1 m$^2$. Said mixture was compacted to a thickness of 55 mm and a density of 150-160 kg/m$^3$. Said mixture was allowed to cure for 5 days.

Top Layer

A mixture was prepared in situ comprising 2.85 kg of cork granules (62.5% by weight), of 2-3 mm granulometry and 130-140 kg/m$^3$ density, and 1.71 kg of polymeric binder (37.5% by weight), at room temperature. The mixture was poured over the previously prepared base layer, in an area of 1 m$^2$. Said mixture was compacted to a thickness of 12 mm and a density of 200-250 kg/m$^3$. Said mixture was allowed to cure for 5 days.

The critical fall height (CFH) measured for the playground surfacing obtained was 2.0 m.

Example 13

Base Layer

A mixture was prepared in situ comprising 6.0 kg of cork granules (50% by weight), of 2-4 mm granulometry and 65-85 kg/m$^3$ density, and 6.0 kg of polymeric binder (50% by weight), at room temperature. The mixture was poured over an area of 1 m$^2$. Said mixture was compacted to a thickness of 83 mm and a density of 125-155 kg/m$^3$. Said mixture was allowed to cure for 5 days.

Top Layer

A mixture was prepared in situ comprising 2.85 kg of cork granules (62.5% by weight), of 2-3 mm granulometry and 130-140 kg/m$^3$ density, and 1.71 kg of polymeric binder (37.5% by weight), at room temperature. The mixture was poured over the previously prepared base layer, in an area of 1 m$^2$. Said mixture was compacted to a thickness of 15 mm and a density of 200-250 kg/m$^3$. Said mixture was allowed to cure for 5 days.

The critical fall height (CFH) measured for the playground surfacing obtained was 2.4 m.

Example 14

Base Layer

A mixture was prepared in situ comprising 8.8 kg of cork granules (50% by weight), of 2-4 mm granulometry and 65-140 kg/m$^3$ density, and 8.8 kg of polymeric binder (50% by weight), at room temperature. The mixture was poured over an area of 1 m$^2$. Said mixture was compacted to a thickness of 120 mm and a density of 140-250 kg/m$^3$. Said mixture was allowed to cure for 5 days.

The critical fall height (CFH) measured for the base layer of the playground surfacing obtained was 2.40 m.

Top Layer

A mixture was prepared in situ comprising 11.9 kg of cork granules (53.1% by weight), of 2-3 mm granulometry and 130-140 kg/m$^3$ density, and 10.5 kg of polymeric binder (46.9% by weight), at room temperature. The mixture was poured over the previously prepared base layer, in an area of 1 m$^2$. Said mixture was compacted to a thickness of 17 mm and a density of 200-250 kg/m$^3$. Said mixture was allowed to cure for 5 days.

The critical fall height (CFH) measured for the playground surfacing obtained was 2.42 m.

From this test, it is concluded that the existence of the top layer on the playground surfacing does not significantly alter the critical fall height.

Example 15

Base Layer

A mixture was prepared in situ, comprising 8.8 kg of cork granules (49.2% by weight), of 2-6 mm granulometry and 65-160 kg/m$^3$ density, and 9.1 kg of polymeric binder (50.8% by weight), at room temperature. The mixture was poured over an area of 1 m$^2$. Said mixture was compacted to a thickness of 120 mm and a density of 280-300 kg/m$^3$. Said mixture was allowed to cure for 5 days.

The critical fall height (CFH) measured for the base layer of the playground surfacing obtained was 2.5 m.

Example 16

Base Layer

A mixture was prepared in situ, comprising 8.8 kg of cork granules (55.7% by weight), of 2-5 mm granulometry and 75-120 kg/m$^3$ density, and 7.0 kg of polymeric binder (44.3% by weight), at room temperature. The mixture was poured over an area of 1 m$^2$. Said mixture was compacted to a thickness of 120 mm and a density of 100-145 kg/m$^3$. Said mixture was allowed to cure for 5 days.

The critical fall height (CFH) measured for the base layer of the playground surfacing obtained was 2.55 m Example 17

Base Layer

A mixture was prepared in situ comprising 8.8 kg of cork granules (55.7% by weight), of 2-5 mm granulometry and 75-120 kg/m$^3$ density, and 7.0 kg of polymeric binder (44.3% by weight), at room temperature. The mixture was poured over an area of 1 m$^2$. Said mixture was compacted to a thickness of 120 mm and a density of 100-145 kg/m$^3$. Said mixture was allowed to cure for 5 days.

The critical fall height (CFH) measured for the base layer of the playground surfacing obtained was 2.5 m.

Top Layer

A mixture was prepared in situ comprising 11.9 kg of cork granules (53.1% by weight), of 2-3 mm granulometry and 150-160 kg/m$^3$ density, and 10.5 kg of polymeric binder (46.9% by weight), at room temperature. The mixture was poured over the previously prepared base layer, in an area of 1 m$^2$. Said mixture was compacted to a thickness of 20 mm and a density of 200-250 kg/m$^3$. Said mixture was allowed to cure for 5 days.

The critical fall height (CFH) measured for the playground surfacing obtained was 2.5 m.

Example 18

Base Layer

A mixture was prepared in situ comprising 5 kg of cork granules (29.0% by weight), of 2-6 mm granulometry and 45-60 kg/m$^3$ density, and 12.5 kg of polymeric binder (71.0% by weight), at room temperature. The mixture was poured over an area of 1 m$^2$. Said mixture was compacted to a thickness of 45 mm and a density of 140-160 kg/m³. Said mixture was allowed to cure for 5 days.

The critical fall height (CFH) measured for the playground surfacing obtained was 1.1 m.

Example 19

Base Layer

A mixture was prepared in situ, comprising 8.8 kg of cork granules (70.0% by weight), of 2-4 mm granulometry and 65-140 kg/m³ density, and 3.77 kg of polymeric binder (30.0% by weight), at room temperature. The mixture was poured over an area of 1 m². Said mixture was compacted to a thickness of 135 mm and a density of 100-130 kg/m³. Said mixture was allowed to cure for 5 days.

The critical fall height (CFH) measured for the base layer of the playground surfacing obtained was 2.0 m.

Example 20

Base Layer

A mixture was prepared in situ comprising 5.1 kg of cork granules (49.6% by weight), of 2-4 mm granulometry and 65-140 kg/m³ density, 4.9 kg of polymeric binder (47.6% by weight) and 0.29 kg of additive (2.8% by weight) based on ammonium polyphosphates, at room temperature.

The mixture was poured over an area of 1 m². Said mixture was compacted to a thickness of 60 mm and a density of 130-160 kg/m³. Said mixture was allowed to cure for 5 days.

The critical fall height (CFH) measured for the base layer of the playground surfacing obtained was 1.9 m.

The invention claimed is:

1. A construction method for playground surfacing, comprising the steps of:
   a) preparing in situ a mixture comprising 29-70% by weight of cork granules and 30-71% by weight of a polymeric binder, at room temperature;
   b) pouring the mixture obtained in step a) on at least one surface area;
   c) compacting said mixture to a thickness in the range of 35-135 mm and to a density in a range of 100-300 kg/m³; and
   d) curing the compacted mixture from step c).

2. The method according to claim 1, wherein the mixture of step a) is carried out with cork granules having a granulometry in the range of 1-6 mm.

3. The method according to claim 2, wherein the mixture of step a) is carried out with cork granules having a granulometry in the range of 2-4 mm.

4. The method according to claim 1, wherein the polymeric binder is selected from the group comprising polyurethane, polyester, polyether, polyacrylate, polystyrene, polyvinyl chloride, polyvinyl acetate, acrylic polyesters, polyethylene, polyepoxide, silicones, of synthetic origin, natural or combinations thereof.

5. The method according to claim 4, wherein the polymeric binder is polyurethane.

6. The method according to claim 1, wherein in step a) at least one additive is also added in the range of 1-20% by weight.

7. The method according to claim 6, wherein the additive is selected from the group comprising pigments, flame retardants, antibacterials, UV degradation protection agents, stabilizing agents, surfactants, antifoaming agents, viscosity changers or combinations thereof.

8. The method according to claim 1, wherein in step c) the mixture is compacted to a thickness in the range of 75-120 mm and to a density in the range of 140-180 kg/m³.

9. The construction method for playground surfacing according to claim 1, wherein it comprises the steps of:
   a) preparing in situ a mixture comprising 51.3% by weight of cork granules and 48.7% by weight of a polymeric binder, at room temperature;
   b) pouring the mixture obtained in step a) on at least one surface area;
   c) compacting said mixture to a thickness of 120 mm and to a density in a range of 140-160 kg/m³;
   d) curing the compacted mixture from step c).

10. The construction method for playground surfacing according to claim 1, wherein it comprises the steps of:
    a) preparing in situ a mixture comprising 50% by weight of cork granules and 50% by weight of a polymeric binder, at room temperature;
    b) pouring the mixture obtained in step a) on at least one surface area;
    c) compacting said mixture to a thickness of 120 mm and to a density in a range of 140-160 kg/m³;
    d) curing the compacted mixture from step c).

11. The construction method for playground surfacing according to claim 1, wherein it comprises the steps of:
    a) preparing in situ a mixture comprising 44.4% by weight of cork granules and 55.6% by weight of a polymeric binder, at room temperature;
    b) pouring the mixture obtained in step a) on at least one surface area;
    c) compacting said mixture to a thickness of 75 mm and to a density in a range of 170-180 kg/m³;
    d) curing the compacted mixture from step c).

12. The method according to claim 1, wherein it further comprises laying an additional top layer.

13. The method according to claim 12, wherein said top layer laying comprises compacting a mixture of cork granules and polymeric binder to a thickness in the range of 7.5-20 mm and to a density in the range of 200-250 kg/m³.

* * * * *